T. RHODUS.
VEHICLE WHEEL.
APPLICATION FILED NOV. 1, 1915.
1,203,050.
Patented Oct. 31, 1916.
2 SHEETS—SHEET 1.
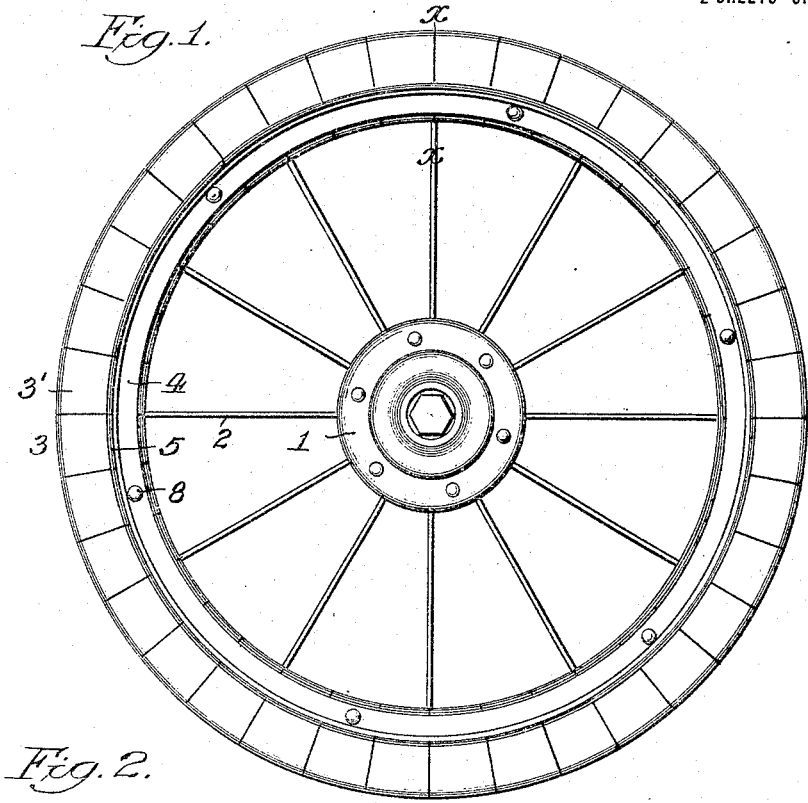
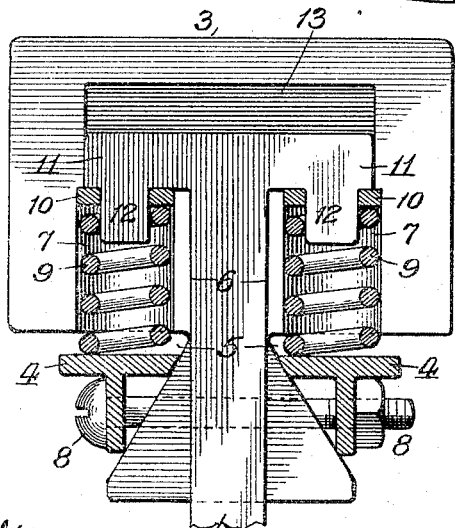
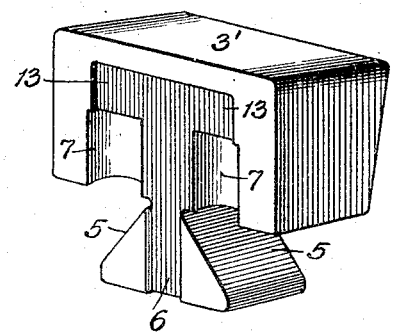
Witness:
John Endere
Inventor:
Thomas Rhodus,
by Robert Burns
Atty.

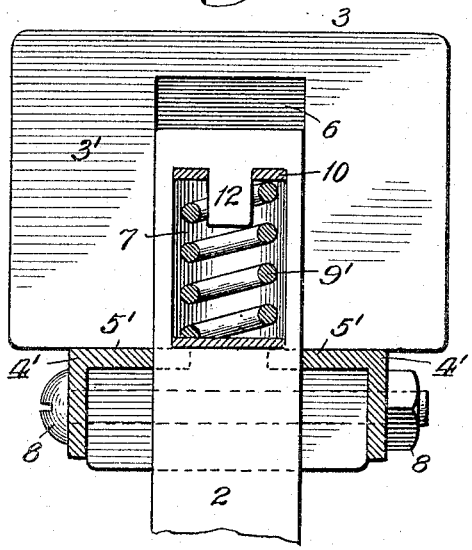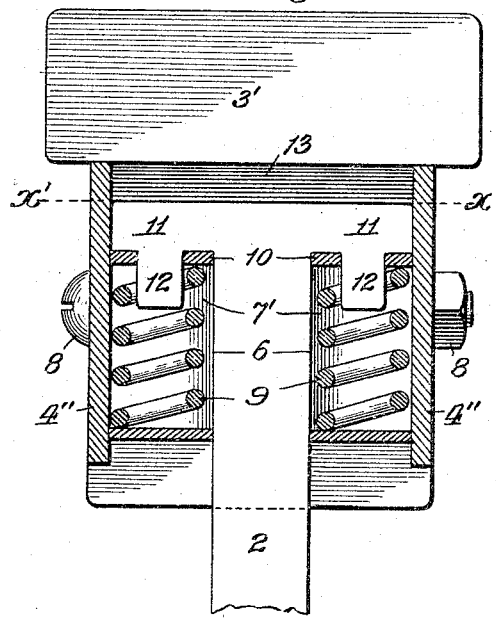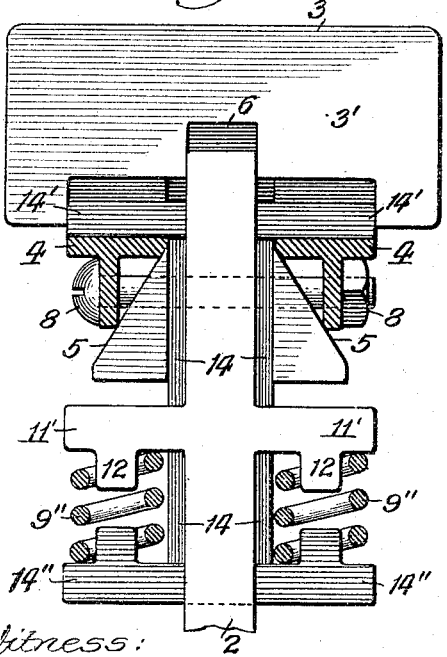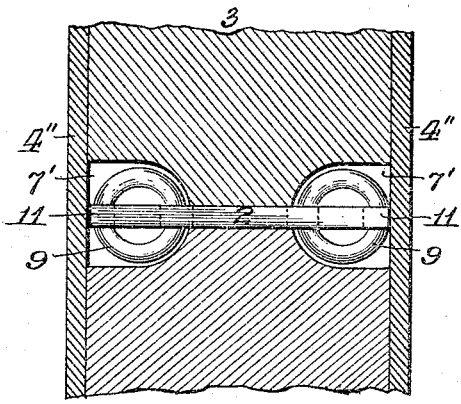

UNITED STATES PATENT OFFICE.

THOMAS RHODUS, OF CHICAGO, ILLINOIS, ASSIGNOR TO CHARLOTTE C. RHODUS, OF CHICAGO, ILLINOIS.

VEHICLE-WHEEL.

1,203,050.  Specification of Letters Patent.  Patented Oct. 31, 1916.

Application filed November 1, 1915. Serial No. 58,956.

*To all whom it may concern:*

Be it known that I, THOMAS RHODUS, a citizen of the United States of America, and a resident of Chicago, in the county of Cook, State of Illinois, have invented certain new and useful Improvements in Vehicle-Wheels, of which the following is a specification.

This invention relates to that class of resilient wheels for vehicles in which the annular tread member is yieldingly connected to the wheel center by a series of intermediate springs. And the present improvement has for its object to provide a simple and efficient structural formation and association of parts in a wheel of the type described, whereby the varying impacts to which the wheel tread is exposed in actual use upon rough roadways is transmitted to and absorbed by the springs in an even and effective manner, with an avoidance of a transference of such impacts to the wheel center and the vehicle parts carried thereon.

Another object is to provide means for tightening and holding together the series of sector shaped blocks comprising the annular tread portion of the wheel structure, and in connection therewith provide substantial inner abutments for the series of resilient members of such structure.

Still another object is to provide a simple and efficient formation of the individual blocks comprising the annular tread portion of the wheel structure, adapting said blocks for effective resilient connection to the center portion of such wheel structure. All as will hereinafter more fully appear.

In the accompanying drawings, Figure 1, is an elevation, illustrating the general arrangement of parts in the present wheel structure. Fig. 2, is an enlarged detail transverse section on line *x—x*, Fig. 1. Fig. 3, is a detail perspective view of one of the blocks comprising the annular wheel tread. Figs. 4, 5 and 6, are detail transverse sections of modified formations and associations of parts. Fig 7, is a detail section on line *x'—x'*, Fig. 6.

Similar reference numerals indicate like parts in the several views.

Referring to the drawings, 1 designates a wheel hub of any usual form, and 2 a series of flexible spokes secured at their inner ends to said hub and preferably formed of flat bars of spring metal. Said hub and spokes constitute the inner member or center of the wheel, and with which the outer and annular tread member 3 is resiliently associated in manner hereinafter described, to form the completed wheel structure.

The tread member 3 may be of any usual and suitable formation but is preferably formed in sections, in manner now to be described.

3' designates a plurality of sector shape blocks or sections formed of any usual and suitable wear resisting material, with their abutting faces preferably formed on lines radial with the axis of the wheel structure, so that when connected together by a pair of connecting rings 4, at their opposite sides, an annular tread structure is formed which is adapted to resist distortion from a normal circular form under varying stresses met with in actual use.

5 designate circumferential recesses or grooves formed in the opposite sides of the tread member 3 for the reception of the connecting rings 4, above referred to, and the form of the recesses 5 will preferably correspond with the cross-section of the connection rings 4. In the preferred form of the present invention said recesses 5 will be of a triangular form in a transverse direction, as shown in Figs. 2, 3 and 5, to correspond with the angular form in cross-section of the preferred form of the connecting rings 4.

6 designates guide recesses formed midway the width of some of the sector shaped tread blocks 3' aforesaid, and preferably in the contacting faces of two adjacent blocks, so that the individual recess in one block in connection with the like individual recess in an adjacent block will constitute a single guide recess for the outer end of one of the flexible spokes 2, hereinafter described in detail.

The construction of the sectional tread member so far described is shown and claimed in my companion application for patent Serial No. 58,955, and no broad claim is made thereto in this case.

7 designate pairs of radially arranged spring containing recesses formed in the width of the tread member 3 in adjacent relation to the guide recesses 6 above described. Said recesses are preferably formed in the contacting faces of adjacent tread blocks 3' in manner similar to that above described in connection with the guide recesses 6.

In the preferred type of the present wheel structure shown in Figs. 2 and 5, the pair of laterally alined connecting rings 4 aforesaid, are of an angular form in cross-section and have inclined inner bearing faces formed by the inner edges of the two component and angularly disposed webs of the respective rings 4. Said inclined inner faces of the rings 4, have bearing against the outwardly disposed inclined faces of the circumferential recesses 5 of the sectional tread member 3, and the arrangement is such that as said pair of rings 4 are drawn toward each other, by means hereinafter described the inclined formation above described, will act to draw the series of tread blocks 3' toward the axis of the wheel structure and thus bind the series of blocks together into a rigid annular body.

8 designate a plurality of transverse adjusting bolts passing preferably through suitably formed orifices in the connecting rings 4 and adjacent tread blocks 3' and adapted in their adjustment to draw the rings 4 together in the manner and for the purpose above stated.

9 designate pairs of compression springs arranged in the radial spring receiving recesses above described, with their inner ends adapted to have bearing upon the perimeters of the respective connecting rings 4 aforesaid, and said springs are preferably provided with bearing washers 10 at their outer ends as shown.

In the preferred form of the wheel structure shown in Figs. 1, 2 and 5, the outer ends of the flexible spokes 2 are arranged in the above described series of guide recesses 6 formed between adjacent pairs of the tread blocks 3' to afford an effective guiding means for the outer ends of said spokes in their independent radial movement in actual use.

11 designate laterally extending prongs or bracket lugs forming a part of, or fixedly attached to the outer ends of the series of flexible spokes 2 aforesaid, and having bearing engagement, preferably through the washers 10 aforesaid, with the outer ends of the series of springs 9, and to such end said prongs 11, will have inwardly extending lugs 12, adapted to engage in central orifices in the washers 10, as illustrated in Figs. 2, 4, 5 and 6.

13 designate laterally expanded outer portions of the recesses or grooves 6 aforesaid, for the movement of the lateral prongs 11 of the spokes 2, above described.

In the modified structure shown in Fig. 5, the single compression spring 9' is employed, and the outer end of each spoke 2, will have a yoke form adapted to embrace the spring with the outer end of said yoke in bearing engagement with the outer end of said spring as shown. In this modified structure the means for tightening the annular series of tread blocks 3' is dispensed with and the perimetrical flanges of the confining rings 4' have engagement in correspondingly formed annular grooves 5' in the opposite sides of the tread member 3.

In the modified structure shown in Fig. 5, duplicate springs 9'' similar to the springs 9 of the preferred structure before described, are disposed wholly inside of the wheel tread 3 and are supported in spaced relation thereto by means of radial I shaped stirrups 14, the outer transverse members 14' of which rest upon the pair of confining rings 4, while the inner transverse members 14'' provide bearings or abutments for the inner ends of the springs 9'' aforesaid. In such modified construction, the laterally extending prongs or bracket lugs 11' of the spokes 2 are also arranged inside the tread member 3 and have bearing upon the outer ends of the springs 9'' as shown.

The modified structure shown in Figs. 6 and 7, is intended to illustrate the application of the present invention to a wheel tread 3 of a continuous nature, as distinguished from the sectional block structure above described. Said modified structure comprises the formation of the spring receiving recesses 7' as open sided cavities in the respective sides of the tread member 3, with open sides of said cavities closed by a pair of laterally alined confining rings 4'' bolted in place, and by which the wheel tread 3 is reinforced. The other parts or elements of said modified structure is substantially the same as that described in connection with Figs. 1 and 2.

In the present improvement, the tendency of the rigid circular tread portion 3 to move into eccentric relation to the wheel center and hub, under the varied stresses met with in actual use, is mainly resisted by the pair of springs 9 above the hub and nearest in line with the direction of said stress and movement of the wheel tread in relation to the wheel center and such resistance is aided more or less by the springs higher than the wheel center and next adjacent to the said pair of springs which are in direct alinement.

Having thus fully described my said invention what I claim as new and desire to secure by Letters Patent, is:—

1. In a wheel, the combination of a hub, a series of flexible spokes carried by said hub and provided with spring engaging means near their outer ends, an annular tread member comprising a series of sector shaped blocks and a pair of laterally alined connecting rings secured to the sides of said series of blocks, said tread member having spring holding recesses and guide grooves formed in abutting faces of said blocks, and a series of springs arranged in the holding recesses aforesaid with their outer ends in bearing engagement with the spring engaging means of the spokes aforesaid, substantially as set forth.

2. In a wheel, the combination of a hub, a series of flexible spokes carried by said hub and provided with lateral spring engaging prongs near their outer ends, an annular tread member comprising a series of sector shaped blocks and a pair of laterally alined connecting rings secured to the sides of said series of blocks, said tread member having spring holding recesses and guide grooves formed in abutting faces of said blocks, and individual pairs of laterally alined springs arranged in the spring holding recesses aforesaid with their outer ends in bearing engagement with the lateral spoke prongs aforesaid, substantially as set forth.

3. In a wheel, the combination of a hub, a series of flexible spokes carried by said hub and provided with spring engaging means near their outer ends, an annular tread member comprising a series of sector shaped blocks and a pair of laterally alined connecting rings secured to the sides of said series of blocks, means for exerting an inward binding stress on said series of blocks, and a series of individual springs associated with said tread member with their outer ends in bearing engagement with the aforesaid spring engaging means of the spokes, substantially as set forth.

4. In a wheel, the combination of a hub, a series of flexible spokes carried by said hub and provided with spring engaging means near their outer ends, an annular tread member comprising a series of sector shaped blocks formed with circumferential recesses in their opposite sides, connecting rings engaging in said recesses, and a series of individual springs associated with said tread member with their outer ends in bearing engagement with the aforesaid spring engaging means of the spokes, substantially as set forth.

5. In a wheel, the combination of a hub, a series of flexible spokes carried by said hub and provided with spring engaging means near their outer ends, an annular tread member comprising a series of sector shaped blocks formed with circumferential recesses of a triangular form in their opposite sides, connecting rings of a triangular form in cross-section engaging in said recesses, transverse adjusting bolts passing through said rings and blocks, and a series of individual springs associated with said tread member with their outer ends in bearing engagement with the aforesaid spring engaging means of the spokes, substantially as set forth.

6. In a wheel, the combination of a wheel center, a series of engaging means carried by said wheel center, an annular tread member comprising a series of blocks and a pair of laterally alined holding rings secured to said blocks, and a series of individual resilient members associated with said tread member with their outer portions adapted to have bearing engagement with the aforesaid engaging means, substantially as set forth.

Signed at Chicago, Illinois, this 29th day of October, 1915.

THOMAS RHODUS.

Copies of this patent may be obtained for five cents each, by addressing the "Commissioner of Patents, Washington, D. C."